United States Patent [19]

Watanabe et al.

[11] 4,091,401
[45] May 23, 1978

[54] DRIVING FORCE-ADJUSTING MECHANISM FOR CAMERA SHUTTER

[75] Inventors: Masanori Watanabe; Eiichi Onda; Mitsuo Koyama; Ichiro Nemoto; Tadashi Nakagawa, all of Yotsukaido, Japan

[73] Assignee: Seiko Koki Kabushiki Kaisha, Japan

[21] Appl. No.: 760,981

[22] Filed: Jan. 21, 1977

[30] Foreign Application Priority Data

Jan. 22, 1976 Japan .................................. 51-5960

[51] Int. Cl.² .............................................. G03B 9/62
[52] U.S. Cl. ...................................... 354/266; 354/242
[58] Field of Search ............... 354/266, 267, 242, 243, 354/244, 250, 251, 252, 261, 262

[56] References Cited

U.S. PATENT DOCUMENTS

| | | | |
|---|---|---|---|
| 2,257,012 | 9/1941 | Hineline | 354/244 |
| 3,739,704 | 6/1973 | Akiyama | 354/243 |

Primary Examiner—Edna M. O'Connor
Attorney, Agent, or Firm—Robert E. Burns; Emmanuel J. Lobato; Bruce L. Adams

[57] ABSTRACT

The operating mechanism for a camera shutter comprises a pivoted actuating member for opening the shutter and a pivoted actuating member for closing the shutter. A driving spring for biasing each of the actuating members in actuating direction has one end acting on the respective actuating member and the other end supported by a ratchet wheel which is coaxial with respective actuating member so that the spring bias can be varied by rotary movement of the ratchet wheel. Spring finger portions of a spring plate which overlies the shutter operating mechanism engage the ratchet wheels to retain them in selected angular positions against the reaction forces of the respective springs. Portions of the spring plate support the spring fingers intermediate their attachment to the spring plate and their free ends engaging the respective ratchet wheels.

6 Claims, 2 Drawing Figures

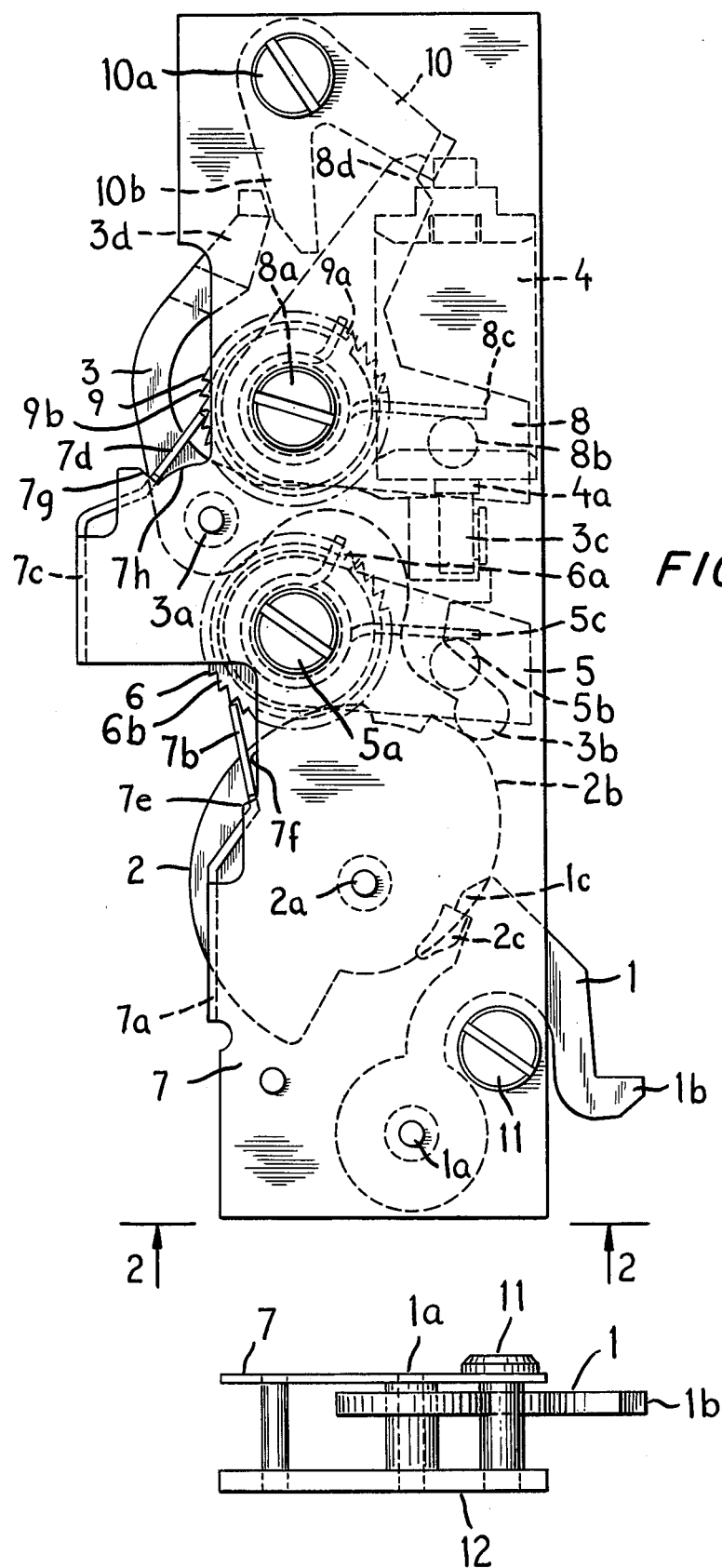

DRIVING FORCE-ADJUSTING MECHANISM FOR CAMERA SHUTTER

FIELD OF THE INVENTION

The present invention relates to the operating mechanism of a camera shutter and in particular to means for adjusting the driving force of one or more actuating members for operating the shutter.

BACKGROUND OF THE INVENTION

In a focal plane camera shutter a leading blade for opening the shutter and a trailing blade for closing the shutter are customarily operated by individual actuating members each biased by a driving spring. For proper shutter operation it is desirable to lessen the unevenness of exposure and to equalize the running speeds of both blades. However, due to manufacturing tolerances it is difficult to equalize the driving force applied to both of the actuating members.

Also, the speed or the driving force of the opening member for starting an exposure directly affects the exposing time of the shutter. In the case of an electronic shutter, the start of the time-control function of the electronic circuits is affected while in the case of a mechanical shutter the working time of delaying mechanism is controlled. Accordingly, in order to control exposure time exactly, measures are necessary to compensate the performance deterioration due to errors in the manufacture of the individual actuating elements by adjusting the driving force acting on such elements.

SUMMARY OF INVENTION

It is an object of the present invention to provide driving force-adjusting mechanism of simple construction small size and low cost. In accordance with the invention, a pivoted actuating member for operating the shutter is actuated by a driving spring, one end of which acts on the actuating member, while the other end is supported by a rotatable ratchet wheel which is coaxial with the actuating member. Thus, the spring bias of the actuating member can be varied by rotary movement of the ratchet wheel. A spring finger portion of a spring plate which overlies the shutter operating mechanism, engages the ratchet wheel to retain it in selected angular position against the reaction force of the driving spring. Moreover, portions of the spring plate are preferably arranged so as to support the spring finger intermediate its attachment to the spring plate and its free end which engages the ratchet wheel. When the shutter mechanism has an actuating member for opening the shutter and a separate actuating member for closing the shutter, each of the actuating members is individually biased by a driving spring, the force of which is individually adjustable by means of a ratchet wheel as described above. Thus, the running speeds of the opening blade and the closing blade of the shutter can be equalized by adjusting the driving force in accordance with the respective characteristics of the blades, including errors arising from manufacturing tolerances.

BRIEF DESCRIPTION OF DRAWINGS

The nature objects and advantages of the invention will be more fully understood from the following description of a preferred embodiment shown by way of example in the accompanying drawings in which:

FIG. 1 is a schematic plan showing an embodiment of the invention in charged or cocked state and FIG. 2 is an end view.

DESCRIPTION OF PREFERRED EMBODIMENTS

In the drawing, the shutter control mechanism, in accordance with the present invention, is shown in charged or cocked state. A releasing lever 1 is pivotally supported between a baseplate 12 and a spring plate 7 for rotation about an axis 1a and is biased in a counterclockwise direction by a spring which is not illustrated. The releasing lever 1 has an operating arm 1b and a locking step 1c formed thereon.

A controlling member 2 is rotatably supported between the baseplate 12 and the spring plate 7 for rotation about an axis 2a and is biased in a counterclockwise direction by a spring which is not illustrated. The controlling member 2 has a cam portion 2b formed on its right-hand circumference and a projection 2c which is engageable by the locking step 1c of the releasing lever 1 to hold the controlling member 2 releasably in cocked position as shown in FIG. 1.

An armature lever 3 is rotatably supported between the baseplate 12 and spring plate 7 for rotation about an axis 3a and is biased in clockwise direction by a spring which is not illustrated. An arm 3b on its lower right-hand portion is pressed against the aforementioned cam portion 2b of the controlling member 2. The lever 3 further has a magnetic portion 3c which constitutes the armature of an electromagnet 4. An upper left-hand portion of the lever 3 is formed as an operating arm 3d.

The electromagnet 4 is connected to an electronic circuit which is not illustrated and has a magnetizable iron core 4a which is located opposite the aforementioned magnetic portion 3c of the armature lever 3 so as to attract the magnetic portion 3c when the electromagnet 4 is energized.

An opening actuating member 5 for starting an exposure by opening the shutter is rotatably supported between the baseplate 12 and the spring plate 7 for rotation about an axis 5a. The opening member 5 is biased in a clockwise direction by a coiled driving spring 5c one end of which acts on a pin 5b on the opening member 5 while the other end is supported by a groove 6a in a ratchet wheel 6 which is rotatably supported between the baseplate 12 and spring plate 7 in coaxial relation with the opening member 5. The ratchet wheel 6 is provided on its circumference with a tooth portion 6b which is engageable by a spring finger portion 7b of the spring plate 7 to retain the ratchet wheel in selected adjusted position. The spring finger portion 7b is formed by an edge portion of the spring plate 7 which is bent downwardly at 7a so as to be perpendicular to the plane of the plate 7 and is partially severed from the plate so as to leave a portion attached to the spring plate and a free end for engagement with the ratchet wheel 6. The spring plate 7 is provided with a portion 7e for supporting an intermediate portion of the spring finger 7b and with an edge portion 7f engageable by a shoulder portion 7i of the spring finger so as to support the spring finger close to the free end which engages the ratchet wheel 6.

A closing actuating member 8 for finishing an exposure is rotatably supported between the baseplate 12 and spring plate 7 for rotation about an axis 8a. The closing member 8 is biased in a clockwise direction by a coiled driving spring 8c one end of which acts on a pin 8b on the closing member 8 so as to exert a force thereon while the other end is supported by a groove 9a of an adjustable ratchet wheel 9 is rotatably supported between the baseplate 12 and spring plate 7 in coaxial relationship with the closing member 8. The ratchet wheel 9 has on its circumference a tooth portion 9b which is engageable by a spring finger 7d of the spring plate 7 so as to retain the ratchet wheel in selected angular position against the reaction of the spring 8c. The spring finger 8d is formed by an edge portion of the spring plate 7 which is bent downwardly at 7c so as to be perpendicular to the plane of the spring plate 7 and is partially severed from the spring plate so as to leave a portion attached to the spring plate and a free end for engagement with the ratchet wheel 9. The spring plate 7 has a portion 7g which supports an intermediate portion of the spring finger 7d and an edge portion 7h which is engageable by a shoulder portion 7j of the spring finger so as to provide support for the spring finger close to the free end thereof which engages the ratchet wheel 9.

The opening member 5 is releasably locked in cocked position as shown in the drawing, by an opening ratchet lever which is not illustrated while the closing member 8 is releasably locked in cocked position by a closing ratchet lever 10 engaging an arm 8d on the closing member 8. The closing ratchet lever 10 is rotatably supported with an axis 10a and is biased in a clockwise direction by a spring which is not illustrated. An arm 10b of the closing ratchet lever 10 protrudes into the range of movement of the operating arm 3d of the armature lever 3.

The spring plate 7 is connected to the shutter baseplate 12 by the screws of axes 5a, 8a and 10 and a pillar 11. On the shutter baseplate the shutter blades are supported in well known manner but are not illustrated in the drawing.

The method of operating shutter and of adjusting the driving force of the opening member 5 and closing member 8 will now be described. When the operating arm 1b of the releasing lever 1 is pushed downwardly from the position shown in the drawing so as to rotate the releasing lever 1 in a clockwise direction, the locking step 1c releases the projection 2c of the controlling member 2. The controlling member 2 is thereupon turned in a counterclockwise direction by its spring which is not illustrated and the projection 2c actuates the starting contact of an electronic circuit which is not illustrated. Next, the cam portion 2b of the controlling member 2 releases the arm 3b of the armature lever 3. However the electromagnet 4 is energized prior to the operation of the releasing lever 1 and hence magnetically attracts and holds the magnetic portion 3c so that the armature lever 3 is not permitted to rotate in a clockwise direction under the action of its biasing spring.

When the controlling member 2 turns further the projection 2c actuates an opening ratchet lever which is not illustrated and thereby releases the opening member 5 for rotation in a clockwise direction by the driving spring 5c to start an exposure.

After the desired exposure time has elapsed as determined by the electronic circuit, the electric current to the electromagnetic 4 is shut off and the electromagnet 4 is thereby deenergized. The magnetic portion 3c is thereby permitted to separate from the iron core 4a so that the armature lever 3 is turned in a clockwise direction by its spring so that the arm 3d of the armature lever 3 pushes on the arm 10b of the closing ratchet lever 10 which is thereupon rotated in a counterclockwise direction against the bias of its spring so as to release the closing member 8. The closing member 8 is thereupon rotated in a clockwise direction by its driving spring 8c so as to close the shutter and finish the exposure.

By the action described above, the exposure operation of the shutter is completed. In order to charge or cock the shutter again, the controlling member 2 is turned in a clockwise direction against its spring and the projection 2c is locked with the locking step 1c of the releasing lever 1. At the same time, the opening member 5 and closing member 8 are turned in a counterclockwise direction against the bias of their respective springs and are locked in the state shown in the drawing.

The spring plate 7 covering the control mechanism supports the working axis of each member and holds down each member with the proper clearance. The spring finger portions 7b and 7d of the spring plate 7 engage the ratchet wheels 6 and 9 so as to retain them in selected position to provide proper spring bias for each of the actuating members 5 and 8. Moreover, in the vicinity of the spring fingers 7b and 7d supporting wall portions 7e, 7f, 7g and 7h of the spring plate 7 are provided so as to support the spring fingers 7b and 7d near of their free ends which engage the ratchet wheels and thereby prevent excessive displacement of the spring fingers by the forces acting on them by reason of the reaction forces of driving springs 5c and 8c acting respectively on the ratchet wheels 6 and 9.

Moreover, it is possible to construct the supporting portions of the spring plate with similar effectiveness by providing other bent parts or fixed pins in the region where the spring fingers 7b and 7d tend to be deflected by the forces exerted on them by the ratchet wheels 6 and 9. Also, it is possible to make the spring of the controlling member 2 adjustable by a projection protruding from the spring plate 7.

According to this invention as can be clearly understood from the foregoing explanation, it is possible to adjust the driving force of the actuating members of the shutter operating mechanism by means of a simplified and low-cost construction. The invention thus makes it possible to lower the production cost of shutters and at the same time, to achieve a simplified miniaturazation of the shutter operating mechanism.

While a preferred embodiment of the invention has been illustrated in the drawings, and is herein particularly described, it will be understood by those skilled in the art that many modifications can be made and that the invention is in no way limited to the illustrated embodiment.

What we claim are:

1. In operating mechanism for a camera shutter, the combination of a pivoted actuating member for operating the shutter, a rotatable ratchet wheel coaxial with said actuating member, a driving spring biasing said actuating member in a direction to actuate the shutter, one end of said spring acting on said actuating member and the other end of said spring being supported by said ratchet wheel whereby the spring bias of said actuating member can be varied by rotary movement of said ratchet wheel, a spring plate overlying said actuating member, ratchet wheel and spring and providing a pivotal support for said actuating member and said ratchet wheel and a spring finger portion of said spring plate engaging said ratchet wheel to retain said ratchet wheel in selected angular position against the reaction of said driving spring.

2. A combination according to claim 1, in which said spring finger portion comprises an edge portion of said spring plate which is bent at right angles to the plane of said plate and partially severed from said spring plate to leave a portion attached to said spring plate and a free end for engagement with said ratchet wheel.

3. A combination according to claim 2, in which said spring plate has supporting portions which support said spring finger portion intermediate its attachment with said spring plate and said free end engageable with said ratchet wheel.

4. In operating mechanism for a camera shutter, the combination of a baseplate, a spring plate supported in spaced parallel relation to said baseplate, a shutter opening member pivotally mounted between said baseplate and said spring plate, a first ratchet wheel rotatably mounted between said baseplate and said spring plate coaxially with said shutter opening member, a first driving spring acting between said opening member and said ratchet wheel to bias said opening member in a direction to open the shutter, whereby the bias applied to said opening member is variable by rotary movement of said first ratchet wheel, a first spring finger portion on said spring plate engaging said first ratchet wheel to retain it in selected angular position against the reaction of said first driving spring, a shutter closing member pivotally mounted between said baseplate and spring plate, a second ratchet wheel rotatably mounted between said baseplate and said spring plate coaxially with said shutter closing member, a second driving spring acting between said closing member and said second ratchet wheel to bias said closing member in a direction to close the shutter, whereby the bias applied to said closing member is variable by rotary movement of said second ratchet wheel, and a second spring finger portion on said spring plate engaging said second ratchet wheel to retain it in selected angular position against the reaction of said second driving spring.

5. A combination according to claim 4, in which each of said spring finger portions comprises an edge portion of said spring plate which is bent at right angles to the plane of said spring plate and is partially severed from said spring plate so as to have one end portion attached to said spring plate and one end free for engagement with the corresponding ratchet wheel.

6. A combination according to claim 5 in which said spring plate has supporting portions which support each of said spring finger portions intermediate its attachment with said spring plate and said free end.

* * * * *